US008121014B2

(12) United States Patent
Kurokawa et al.

(10) Patent No.: US 8,121,014 B2
(45) Date of Patent: Feb. 21, 2012

(54) METHOD AND APPARATUS FOR DETERMINING THE READING POWER OF AN OPTICAL REPRODUCING DEVICE

(75) Inventors: Takahiro Kurokawa, Fujisawa (JP); Hiroyuki Minemura, Kokubunji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1406 days.

(21) Appl. No.: 11/675,699

(22) Filed: Feb. 16, 2007

(65) Prior Publication Data

US 2008/0067422 A1 Mar. 20, 2008

(30) Foreign Application Priority Data

Sep. 14, 2006 (JP) ................................. 2006-248875

(51) Int. Cl.
*G11B 7/00* (2006.01)
(52) U.S. Cl. ........................................ 369/116; 369/47.5
(58) Field of Classification Search .................. 369/47.5, 369/47.51, 47.52, 47.53, 116, 13.26–13.31
See application file for complete search history.

(56) References Cited

U.S. PATENT DOCUMENTS

| | | | |
|---|---|---|---|
| 6,392,970 B1* | 5/2002 | Fuji et al. ....................... | 369/116 |
| 6,711,108 B2* | 3/2004 | Mashimo et al. ............. | 369/116 |
| 6,751,513 B1* | 6/2004 | Spruit ............................ | 369/116 |
| 2001/0005340 A1* | 6/2001 | Nishikawa ................... | 369/53.27 |
| 2003/0185118 A1* | 10/2003 | Takeda ......................... | 369/47.39 |
| 2005/0163008 A1 | 7/2005 | Mamiya et al. | |
| 2007/0195666 A1* | 8/2007 | Ko et al. ....................... | 369/47.5 |

FOREIGN PATENT DOCUMENTS

| | | |
|---|---|---|
| EP | 0 833 312 | 4/1998 |
| JP | 04-362525 | 12/1992 |
| JP | 2002-025060 | 1/2002 |
| JP | 2003-006941 | 1/2003 |

OTHER PUBLICATIONS

Blu-ray Disc Founders, Aug. 2004.

* cited by examiner

*Primary Examiner* — Tan X Dinh
(74) *Attorney, Agent, or Firm* — Antonelli, Terry, Stout & Kraus, LLP.

(57) ABSTRACT

Since the conventional optical disk recording/reproducing apparatus cannot correctly measure a power of a main beam that is a part of the laser light outputted from an objective lens and is focused on a recording layer to contribute to recording/reproducing, it is difficult to accurately control a read power. A ratio of a proper read power to a threshold power of erasing is acquired beforehand. The read power is determined by measuring the threshold power of erasing and multiplying it by the ratio when learning of the read power is performed for each drive device. According to the read power learning method of this invention, it becomes possible to determine the proper read power regardless of performance variance of an optical pickup and sensitivity dispersion of a medium.

19 Claims, 5 Drawing Sheets

METHOD AND APPARATUS FOR DETERMINING THE READING POWER OF AN OPTICAL REPRODUCING DEVICE

CLAIM OF PRIORITY

The present application claims priority from Japanese application JP 2006-248875 filed on Sep. 14, 2006, the content of which is hereby incorporated by reference into this application.

FIELD OF THE INVENTION

The present invention relates to a read power learning method that, when recording or reproducing information by irradiating light onto an information recording medium, makes it possible to correctly reproduce information with a low error rate so as not to lose recorded information accidentally. Moreover, another aspect of this invention relates to an information recording/reproducing apparatus capable of performing the read power learning method according to the above-mentioned aspect of this invention, and the information recording medium to which the read power learning method according to the above-mentioned aspect of this invention can be applied.

BACKGROUND OF THE INVENTION

The optical disks known as CD (Compact Disc), DVD (Digital Versatile Disc), etc. have spread widely as compact information recording media with large capacities. As a recording film of the optical disk on which information is rewritable, one that uses a phase change material has become commercially practical and the one enables information to be recorded, erased, or overwritten by means of reversible phase change between a crystal phase and an amorphous phase of the material.

In this type of rewritable optical disk, recording of information is made possible by irradiating high-power laser light onto the recording film and forming amorphous recording marks. It utilizes a fact that, when light is irradiated onto a recording film, its reflectivity is different between the recording mark of an amorphous material and a portion that is a crystalline layer and is other than the recording mark. On the other hand, reproduction of information is made possible by irradiating laser light of such a low power as does not change the recording film and detecting a difference of the reflectivity between the recording mark (amorphous phase) and the portion other than the mark (crystal phase). Moreover, erasing of information is made possible by irradiating laser light of a medium power between the high-power laser light at the time of information recording and the comparatively low-power laser light at the time of information reproduction. On the other hand, overwriting information becomes possible by irradiating a combination of the high-power light and the medium-power light.

Now, looking specifically at the phase change type optical disk, if it is subjected to information reproduction with laser light of an excess power, or if the same portion is repeatedly reproduced many a time, there occurs a phenomenon that a part of the amorphous phase returns to the crystal phase, namely a part of the mark are erased. By this phenomenon, some of the recording marks deteriorate and become hard to recognize, and accordingly a reproduction error tends to occur.

Especially, in the case of a combination of a high-density optical disk, such as the BD disk (Blue-ray Disc) that has been put in practical use lately and an optical system that uses a short-wavelength blue light source (wavelength is approximately 400 nm) as a light source, since a light spot size is small and the power density of the spot is large, recording mark deterioration during reproduction tends to occur easily as compared with a case of a red light source even when the information is reproduced using the same power; therefore, the read power cannot be made larger than that of the case of the red light source. The BD disk is described in detail in White Paper: Blu-ray Disc Format—General.

Practicably, since the disk is required to allow the information to be reproduced repeatedly for $10^6$ to $10^8$ times or more, it is often the case that an upper limit of the read power is specified for each disk medium or specified collectively by a standard in order to guarantee a predetermined number of reproducible times. In addition, from the viewpoint of protection of recorded information, when reproducing an optical disk in a drive device, an upper limit of the read power in the case of using a read power of, for example, a blue light source must be strictly observed.

However, since laser lights of short wavelengths like a blue light source have small photoelectric conversion efficiencies in photodetectors and the signal to noise ratio of a readout signal found when information is reproduced with the laser light of a short wavelength is small, a reproduction error tends to be produced. Therefore, from the viewpoint of reliability (low error rate) of information reproduction, it is desirable that the read power is as large as possible in order to obtain a large signal to noise ratio of the readout signal.

In order to establish compatibility between the above-mentioned two requirements, that is, protection of recorded information and reliability of information reproduction at the time of reproducing recorded information, the read power must be controlled with high accuracy. As the conventional method for controlling the read power, for example, there has been used a method for controlling the magnitude of a current flowing in a laser diode of a light source so that the laser light outputted from the objective lens may be kept at a predetermined magnitude. This method configures the system such that a part of the laser light outputted from a laser diode is divided in a halfway, and is made to enter into a photodetector for exclusive use (front monitor), and it controls the drive current of laser diode so that the output current of the front monitor may be maintained at a predetermined magnitude.

SUMMARY OF THE INVENTION

In the case where a desired read power is outputted using a conventional method for controlling a read power with a front monitor, it is necessary to calibrate the front monitor beforehand in terms of a relation between the output current of the front monitor and the read optical power. However, an actually measurable numeric value is a total power of the laser light outputted from an objective lens, whereas the light outputted from the objective lens includes a component of light other than light that is focused on the recording layer and contributes to the readout signal. Therefore, it was difficult to correctly measure the power of the light that was focused on the recording layer and contributed to the reproduction, namely to correctly calibrate the front monitor in terms of the relation of the output current of the front monitor and the power of the read light. For this reason, the conventional read power control method has been unable to control with high accuracy so that the read power may become a desired magnitude.

As the light that is included in the light outputted from the objective lens and does not contribute to the readout signal, for example, sub beams in the case where the three beam tracking method is used can be enumerated. In many optical disk recording/reproducing apparatuses, a tracking method by three beams called DPP (Differential Push-Pull) method is used in order to cancel an offset generating in the tracking error signal caused by lens shift (shift of the objective lens from the optical axis).

In this method, in order to generate three optical beams, an optical beam emitted from a laser diode of a light source is split into 0th order light ray and ±1st order light rays (sub beams) with a diffraction grating, as shown in FIG. 7. Although in this scheme, only the main beam contributes to the readout signal, the objective lens takes in all of the main beam and the sub beams.

In addition, there is a case where undesired light that will not be focused on the recording layer is included in the light outputted from the objective lens besides the sub beams. This may include, for example, stray light generated in the pickup, light that is not focused by the objective lens, etc. Empirically, the amount of such light is considered to be of the order of approximately 5 to 10% or less.

Note here that, since light that is a part of the laser light outputted from the objective lens and is focused on the recording layer to contribute to reproduction is only the main beam, a proportion of the power of the main beam to the power of the laser light outputted from the objective lens must be calibrated.

However, when performing calibration in terms of the relation of the power of the main beam and the front monitor output current, what can be measured using an optical power meter etc. is only a total power outputted from the objective lens. Accordingly, the power of the main beam cannot be directly measured, and will be found by converting the measured total power using designed values of the diffraction efficiency of the diffraction grating, the transmission efficiency of the objective lens, etc. In this conversion, since actual values of the diffraction efficiency of the diffraction grating and the transmission efficiency of the objective lens often shift from designed values, it is difficult to acquire a correct magnitude of the power of the main beam.

Because of this, in the conventional optical disk recording/reproducing apparatus, in the case of a pickup such that the power of light outputted from the objective lens becomes larger than the designed value, light will be irradiated exceeding the upper limit of the read power. Therefore, there was a case where the recording mark was deteriorated.

When the power of the main beam exhibits a variation, it is necessary to lower a control target value of the read power by an amount comparative to the variation of the power in order to strictly observe the upper limit of the read power. However, by doing this, lowering of reproduction performance caused by a shortage of the signal to noise ratio of the readout signal will appear conversely.

Furthermore, occurrence of a variation of film thickness of the recording media, a variation of recording sensitivity to the recording medium, etc. must be taken into account.

Then, in creation of this invention, it becomes necessary to provide a read power learning method that makes it possible to correctly reproduce information with a low error rate and without erroneously losing information recorded on an information recording medium. The inventors examined both an information recording/reproducing apparatus capable of this read power learning method and an optical disk to which this read power learning method, in addition to the read power learning method itself.

In this invention, in order to determine a proper read power with high accuracy and at high speed, the threshold power Pth at which a recording mark is erased is measured to derive a proper read power.

Therefore, a ratio $\alpha$ of the proper read power to the threshold power of erasing Pth is found beforehand. Here, the proper read power means a power at which information recorded on a disk can be repeatedly reproduced for a predetermined number of times (of the order of $10^8$ to $10^8$). The threshold power of the erasing means a power that can vary a physical quantity obtainable from a readout signal by a predetermined magnitude through one-time DC erasing. DC irradiation means irradiation of light on the recording mark while maintaining a constant power.

When determining a proper read power for each drive device, the read power is found by measuring the threshold power of erasing Pth and multiplying the Pth by the above-mentioned $\alpha$.

Note that, since $\alpha$ is different for each disk, it is necessary to obtain it beforehand for a disk used in the read power leaning.

Here, as an example, a result of finding $\alpha$ by an experiment is shown. FIG. 2 is a plot of a relation between the number of reproducible times and the read power for a rewritable disk (sample 1). The number of reproducible times was determined based on the readout error rate. When a normal number of times of reproduction was assumed $10^8$ times, the proper read power Pr(n) was 0.32 mW. FIG. 3 is a plot of a relation between the erase power and the signal modulation after one-time DC erasing by the erase power for the same disk (sample 1). The modulation is normalized by an initial value before the erasing. Assuming that the threshold power of erasing Pth was an erase power when the modulation became one half (50%) the value before erasing, the threshold power of the erasing was 1.08 mW. That is, being found from an experimental value about this disk (sample 1), $\alpha$ was $\alpha=0.32/1.08=0.30$.

Note that although in this calculation, the erase power at which the modulation became one half (50%) the modulation before the erasing was defined as the threshold power of erasing, the value is not limited to this and it is just recommended to set the threshold power of erasing in a region where the modulation changes largely to the change of the power.

Although the example of finding the coefficient $\alpha$ by the experiment was shown here, the coefficient $\alpha$ may be recorded beforehand on the information recording medium. In that case, it is preferable that the coefficient $\alpha$ is recorded in a control data area.

FIGS. 4 and 5 show results of the same experiment performed on another disk (sample 2) as the contents explained in the above. For the sample 2, the proper read power was approximately 0.40 mW and the threshold power of erasing was 1.25 mW. That is, $\alpha$ was $\alpha=0.40/1.25=0.32$.

If when finding the threshold power of erasing Pth in a drive device, a recording track is divided into a plurality of areas and the erase power is changed for the each area, it is possible to find the Pth by a single operation of erasing.

Adoption of the read power learning method of this invention makes it possible to determine a proper read power regardless of performance variance of an optical pickup etc. and sensitivity dispersion of a medium etc.

DETAILED DESCRIPTION OF THE PREFERRED EMBODIMENTS

Figure 1:
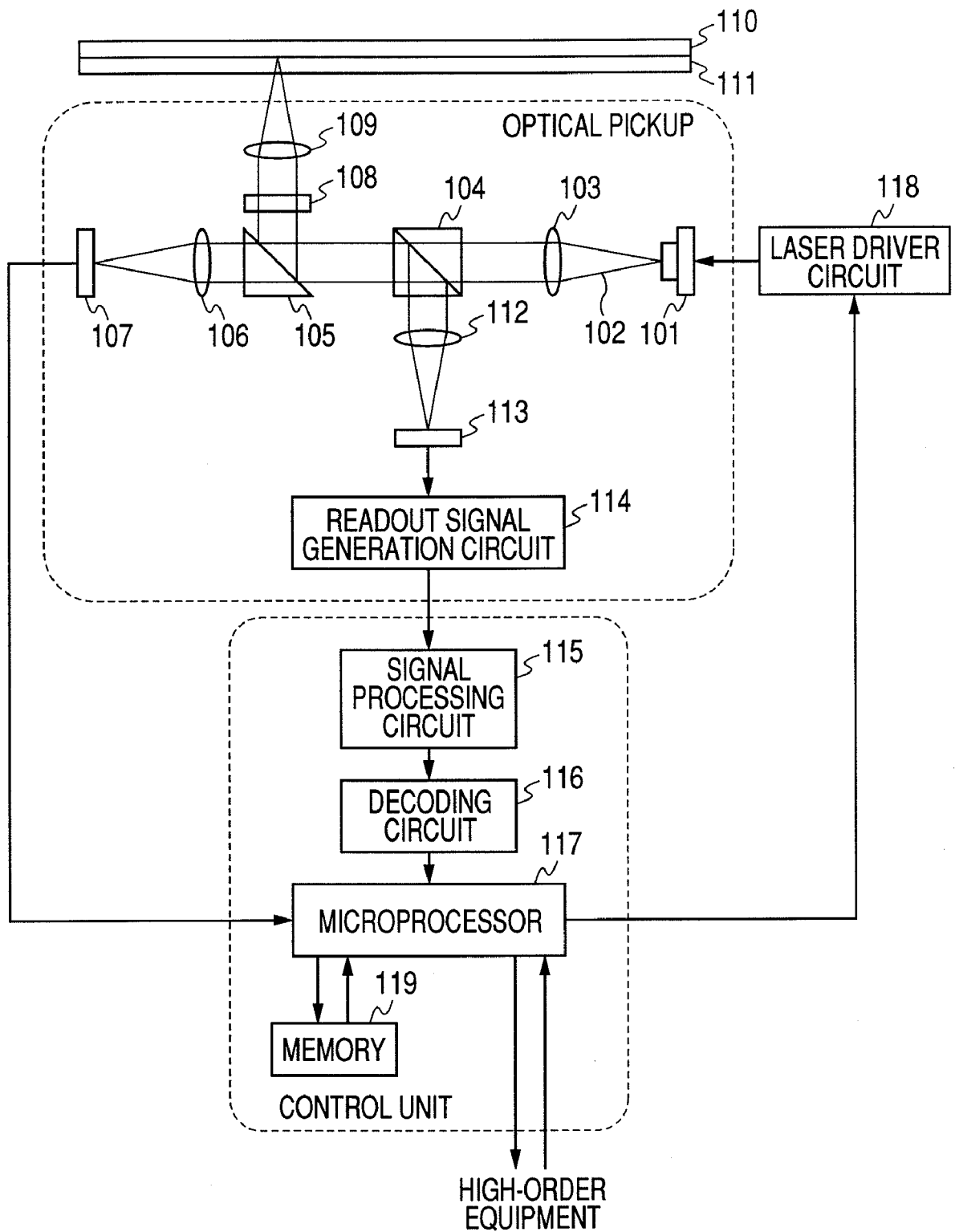
FIG. 1 is a schematic diagram of an information recording/reproducing apparatus that adopted this invention.
Figure 2:
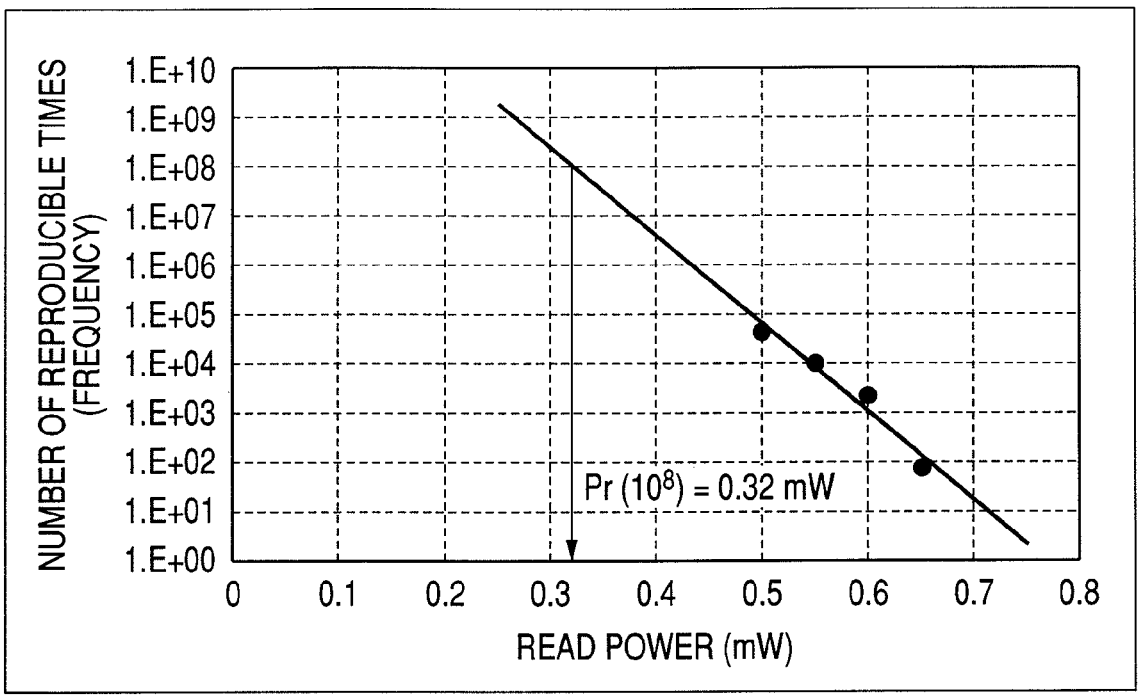
FIG. 2 is a diagram showing a relation between a read power and a number of reproducible times (sample 1)
Figure 3:
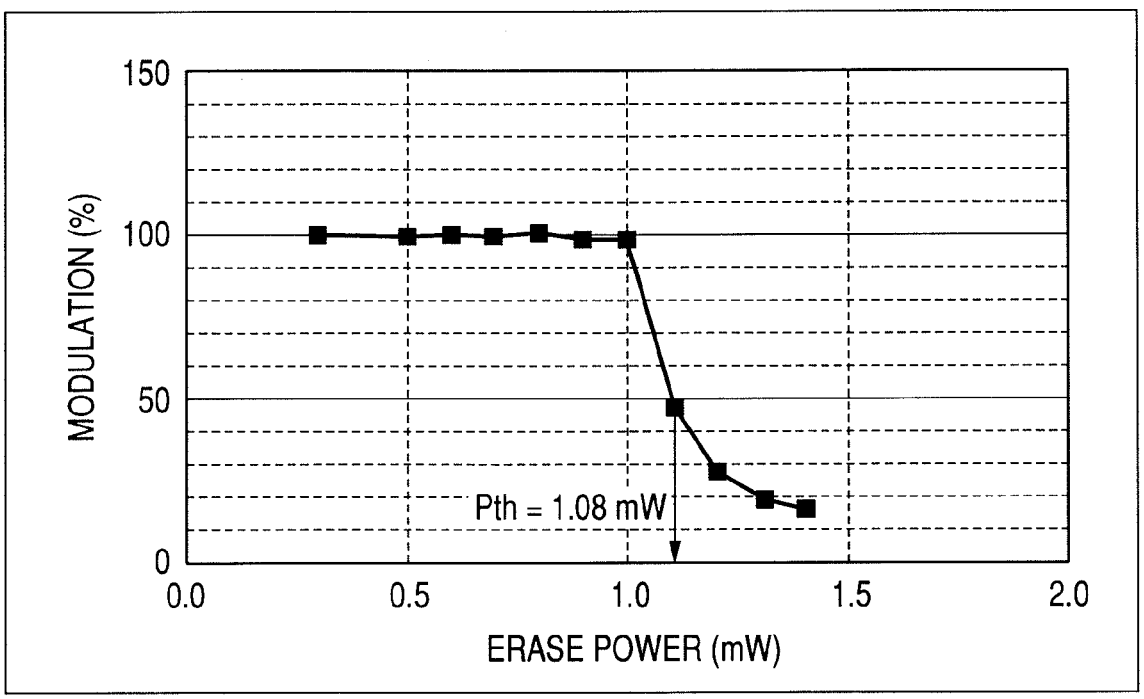
FIG. 3 is a diagram showing a relation between an erase power and a modulation (sample 1)
Figure 4:
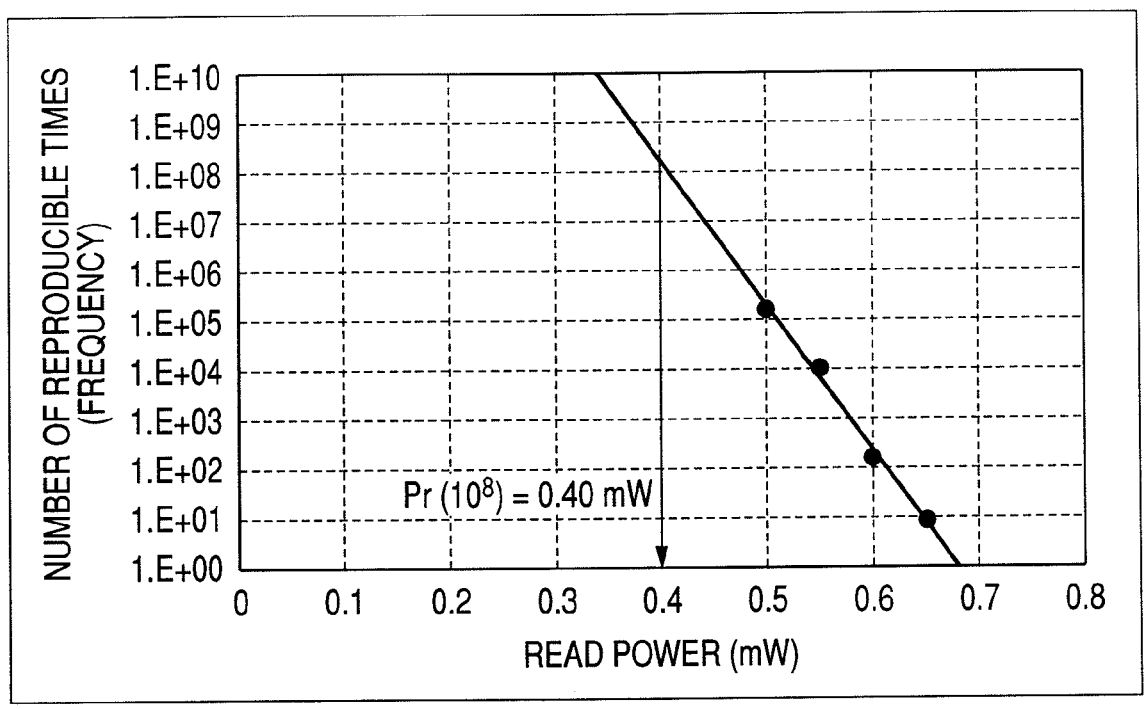
FIG. 4 is a diagram showing a relation between a read power and a number of reproducible times (sample 2)
Figure 5:
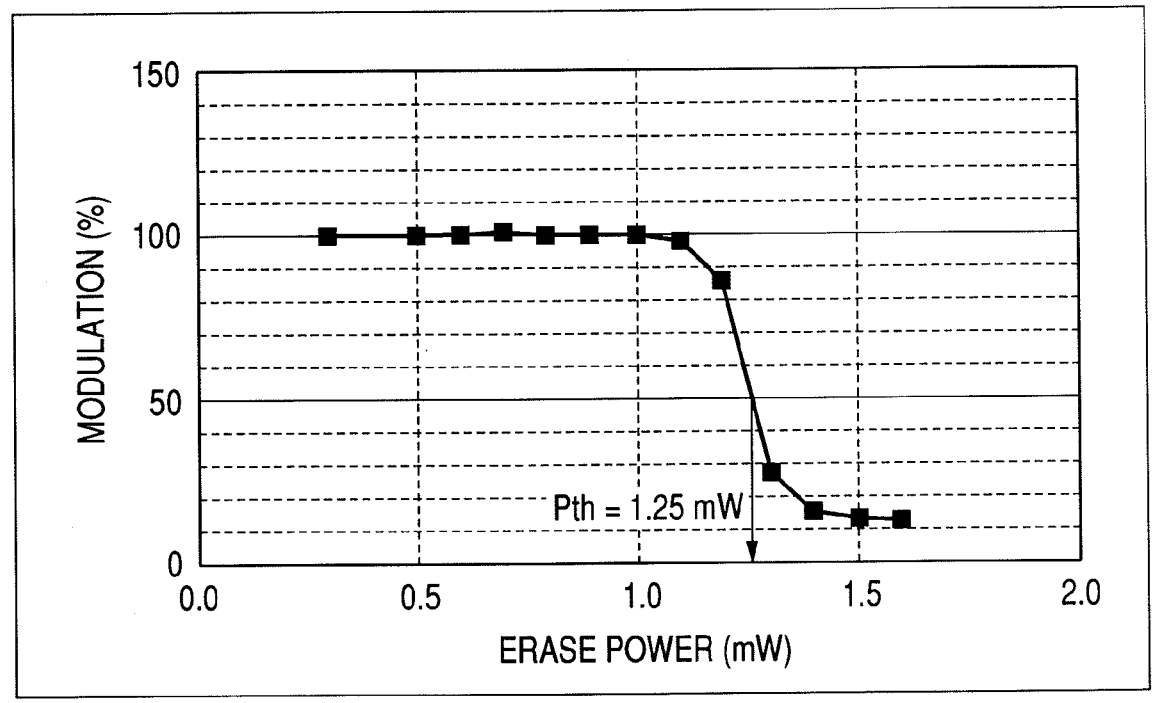
FIG. 5 is a diagram showing a relation between the erase power and the modulation (sample 2)

A configuration of an embodiment in the case where this invention is applied to an information recording/reproducing apparatus will be described using FIG. 1. Linearly polarized laser light 102 emitted from a laser diode 101 is made into collimated light by a collimator lens 103 and is incident on a polarizing beam splitter 104. The polarizing beam splitter 104 is an optical element with a property that allows linearly polarized light polarized in a certain direction to be transmitted almost in a lossless manner and reflects linearly polarized light polarized in a direction perpendicular to that direction almost in a lossless manner. The polarizing beam splitter 104 of FIG. 1 is disposed to allow the laser light 102 generated from the laser light 101 to be transmitted almost in a lossless manner. The laser light 102 transmitted through the polarizing beam splitter 104 is reflected by a half mirror 105 and changes its direction to a vertical direction. The half mirror 105 is designed to transmit only a part of the incident light. The transmitted laser light 102 is focused by a front monitor lens 106 located ahead, and is incident on a front monitor 107 located further ahead. The front monitor 107 outputs a current in proportion to a power of laser light incident thereon. The current outputted from the front monitor 107 is usually used to monitor the power outputted from the laser diode 101 and control the power. The laser light 102 reflected by the polarizing beam splitter 104 changes to circularly polarized light by being transmitted through a quarter-wave plate 108. The laser light 102 having changed to the circularly polarized light is focused by an objective lens 109 and is incident on an optical disk 110.

The laser light 102 reflected by a recording layer 111 of the disk passes through the objective lens 109 again, and is transmitted through quarter-wave plate, whereby it returns to the linearly polarized light. At this time, its polarization direction has become in the direction perpendicular to that of the outward trip. For this reason, after being reflected by the half mirror 105, the laser light 102 is transmitted through the polarizing beam splitter 104 almost in a lossless manner. After that, the laser light 102 is focused by a detection lens 112 and is incident on a photodetector 113.

A structure except for the above-mentioned optical disk 110 is usually realized by the optical pickup as an optical system.

Based on this basic structure, information will be recorded by changing the state of the recording layer with heat of the laser light focused by the objective lens. On the other hand, information will be reproduced by reading change of the reflectivity caused by change of the state of the recording layer with the laser light focused by the objective lens. The change of the reflectivity of the recording layer is detected as a change of the output current of the photodetector.

The output current of the photodetector 113 is converted into a readout signal by a readout signal generation circuit 114. The readout signal is sent to a control unit from the readout signal generation circuit 114. After being subjected to signal processing of waveform equalization etc. in a signal processing circuit 115, the readout signal is converted into a binary signal in a decoding circuit 116. The binary signal is converted into data in a microprocessor 117, and is sent to high-order equipment. When recording the data, the date sent from the high-order equipment is coded by the microprocessor 117 to generate a recording signal. The recording signal is sent to a laser driver circuit 118, which modulates a current to be flown in the laser diode 11 based on the sent recording signal.

Recording of information on the optical disk is done by changing a state of the recording layer with heat of the laser light focused by the objective lens. On the other hand, reproduction of information is done by reading the reflectivity change resulting from the state change of the recording layer with the laser light focused by the objective lens.

Figure 6:
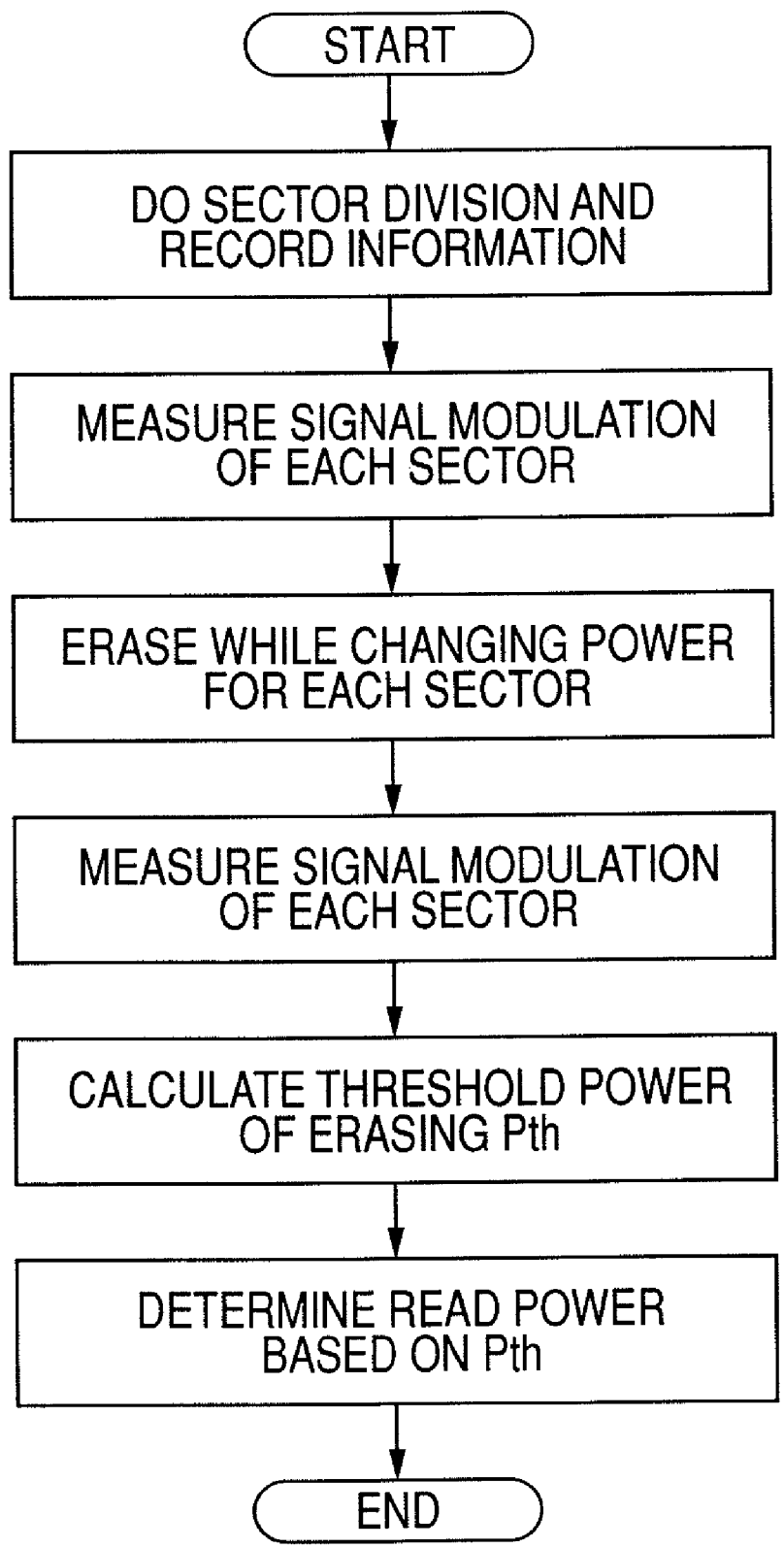
FIG. 6 is a flowchart showing a procedure of read power learning of this invention.
Figure 7:
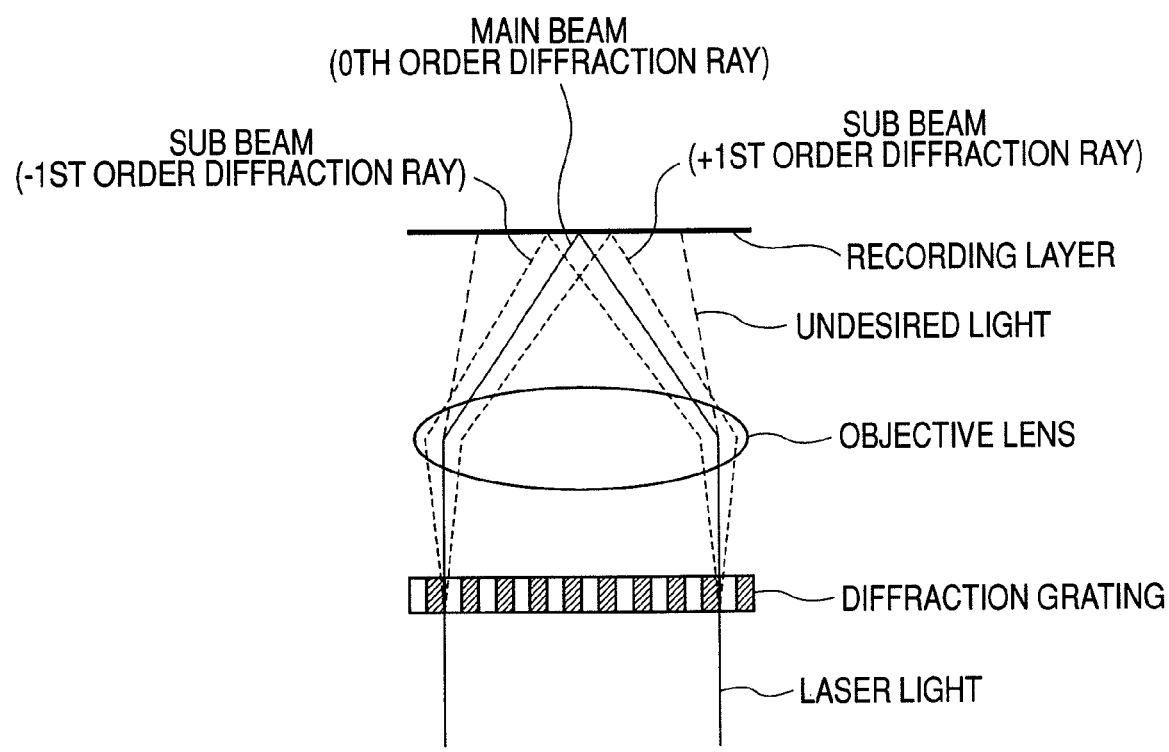
FIG. 7 is a diagram showing beam division in the case of the three beam tracking system.

Next, a procedure of read power learning processing of this invention will be explained using a flowchart of FIG. 6.

Here, in Step 3 and Step 5, a signal modulation is used as an example of physical quantities that are obtainable from the readout signal. The signal modulation in a state where information is recorded on an information recording medium is specified as an initial signal modulation; a signal modulation after the recorded information is erased is specified as a signal modulation after alteration.

In Step 6, the threshold power of erasing Pth is found from a variation of the signal modulation. Note that, although a variation of the signal modulation is observed in a process where information recorded on the information recording medium is being erased, a variation during this process is not constant. Therefore, in finding the threshold power of erasing Pth, a power at which the signal modulation varies most steeply in a rough estimate is determined as the threshold power of erasing Pth.

If, when a variation of the signal modulation is measured in a process where information recorded on the information recording medium is being erased and its measurement error is large, values of the threshold power Pth derived therefrom inevitably exhibit large dispersion. The inventors have found that in order to minimize the dispersion, it is preferable that a power at which the signal modulation varies most steeply in the plot of the signal modulation, namely, a power such that in its vicinity a physical quantity (for example, signal modulation) for a unit variation of the power is the largest, is defined as the threshold power Pth.

In order to find the threshold power of erasing Pth, the signal modulation was adopted as a physical quantity here. In the case of the signal modulation, a time when it exhibits a steepest variation is considered a point of time when an initial signal modulation is lowered to approximately one half. Therefore, in the case where the signal modulation is adopted as a physical quantity, a power that gives a signal modulation being approximately one half the initial signal modulation is determined as the threshold power of erasing Pth.

The threshold power Pth is defined, for example, by a power at which a physical quantity varies by a predetermined magnitude in a process where information recorded on the information recording medium is being erasing. Although in this embodiment, a certain power at which the signal modulation becomes approximately one half the initial signal modulation in the vicinity of the power is determined as the threshold power of erasing Pth, the threshold power Pth can be found using the readout error rate or jitter as other physical quantity.

In such cases, a power at which reproduction bit error rate becomes $10^{-4}$ through one-time DC erasing or jitter becomes 10% can be defined as the threshold power Pth. However, since there may be cases where the readout error rate and the jitter shown here differ in magnitude depending on performance of the information reproducing apparatus, if those powers are applied simply, they may not give exact results.

Moreover, in Step 7, the read power is determined by multiplying the found threshold power Pth by the coefficient α. The coefficient α is a ratio of a read power Pr(n) at which information recorded on the disk can be repeatedly reproduced for a predetermined number of times (of the order of $10^6$ to $10^8$) to the threshold power of erasing Pth (a power that can vary the signal amplitude or the signal modulation by a predetermined magnitude through one-time DC erasing). The number of reproducible times is determined based on the readout error rate. Since the coefficient α is a numeric value peculiar to the information recording medium, it will be multiplied to the threshold power Pth for which the coefficient α peculiar to the information recording medium to be used was obtained. Incidentally, if the coefficient α is recorded beforehand on the information recording medium, the recorded α is used; if the coefficient α is not recorded, it becomes necessary to find the coefficient α only for initial calculation, as described above.

In the case where the coefficient α is recorded beforehand on the recording medium, it is desirable that the coefficient α is recorded in the control data area of the information recording medium. However, the coefficient α may be recorded in other areas, and doing so does not cause any inconvenience.

Moreover, in the case where the coefficient α is not recorded beforehand on the information recording medium, the coefficient α will be found, as described above. It is recommended that the coefficient α be recorded on the information recording medium after this. Even in the case where the coefficient α is not recorded on the information recording medium, provided that the information recording/reproducing apparatus having found the coefficient α keeps the found coefficient α along with specific information that can specify an information recording medium, or actually, a maker and its model of the information recording medium, even when subsequently operating the information recording medium that does not record the coefficient α, the kept coefficient α can be used.

Step 1: Start processing.
Step 2: Do sector division and record information.
Step 3: Measure initial signal modulation in each sector. Here, the modulation m is defined by the following formula (Formula 1), $$m = (V_H - V_L)/V_H \quad \text{(Formula 1)}$$

where $V_H$: Upper envelope level of the readout signal and
$V_L$: Lower envelope level of the readout signal.

Step 4: Erase information that was recorded by doing sector division, sector by sector, while changing the erase power in each sector.
Step 5: Measure the signal modulation after alteration for each sector.
Step 6: Find the threshold power of erasing Pth.
For example, an erase power at which the signal modulation becomes one half the initial value is found.
Step 7: Determine the read power based on the found threshold power Pth.
Step 8: End the processing.

Since a procedure of the read power learning method that this invention adopts is common with a procedure of recording power learning (OPC; Optimum Power Control), the former can use a processing block of the later.

In addition, although in the embodiment of this invention, the number of reproducible times that makes contribution when determining the coefficient α is determined based on the readout error rate, the determination is not limited to this and it may be determined based on, for example, the readout signal jitter. The readout signal jitter is a quantity of a phase difference between the binarized readout signal and a channel clock generated from the binarized readout signal that is normalized by a period of the channel clock.

What is claimed is:

1. A read power learning method, comprising the steps of:
measuring an initial value of a signal amplitude or a signal modulation from a readout signal when light is irradiated onto a recording mark formed on an information recording medium to obtain the readout signal;
irradiating the light while changing an erase DC power for each region of the recording medium;
measuring a second value of a signal amplitude or a signal modulation by the light irradiation with reproducing power level after a step of said irradiating the light;
finding a power Pth to be a certain ratio of the second value to the initial value; and
determining the read power of the irradiation light based on the power Pth.

2. The read power learning method according to claim 1, wherein the power Pth is a power of the irradiation light required to vary by a predetermined ratio the amplitude of the readout signal that is found when light is irradiated onto the recording mark once by means of DC irradiation.

3. The read power learning method according to claim 1, wherein the read power is calculated by multiplying the power Pth by a predetermined coefficient α.

4. The read power learning method according to claim 3, wherein the coefficient α is a ratio of a read power Pr(n) at which information recorded on the information recording medium can be reproduced for a predetermined number of times to the power Pth.

5. The read power learning method according to claim 4, wherein the read power Pr(n) is a power required to vary a readout error rate to a predetermined value by irradiating light onto the recording mark for a predetermined number of times.

6. The read power learning method according to claim 3, wherein the coefficient α is recorded beforehand on the information recording medium.

7. A read power learning method, comprising the steps of:
measuring a first value of a physical quantity acquirable from a readout signal when light is irradiated onto a recording mark formed on an information recording medium to obtain the readout signal;
irradiating light onto the recording mark while varying its power;
measuring a second value of the physical quantity when obtaining the readout signal by the light irradiation;
finding a power Pth required to vary the physical quantity by a predetermined magnitude, from the first value of the physical quantity to the second value of the physical quantity; and
determining the read power of the irradiation light based on the power Pth;

wherein the step of measuring the first of the physical quantity is a step of measuring an initial signal modulation of each sector from the readout signal, the step of irradiating the light is a step of irradiating the light while changing the erase power in each sector and erasing the recording mark, the step of measuring the second value of the physical quantity is a step of measuring the signal modulation after alteration for each sector, and the step of finding the power Pth is a step of finding a read power of the irradiation light required to vary the initial signal modulation to the after-alteration signal modulation by a predetermined magnitude.

8. The read power learning method according to claim 7, wherein the power Pth is a power required to vary by a predetermined ratio the amplitude of the readout signal that is found when light is irradiated onto the recording mark once by means of DC irradiation.

9. The read power learning method according to claim 7, wherein the read power is calculated by multiplying the power Pth by a predetermined coefficient $\alpha$.

10. The read power learning method according to claim 9, wherein the coefficient $\alpha$ is a ratio of the read power Pr(n) at which information recorded on the information recording medium can be reproduced for a predetermined number of times to the power Pth.

11. The read power learning method according to claim 10, wherein the read power Pr(n) is a power required to vary a readout error rate to a predetermined value by irradiating light onto the recording mark for a predetermined number of times.

12. The read power learning method according to claim 10, wherein the read power Pr(n) is a power required to vary readout signal jitter to a predetermined value by irradiating light onto the recording mark for a predetermined number of times.

13. The read power learning method according to claim 9, wherein the coefficient $\alpha$ is recorded beforehand on the information recording medium.

14. An information recording and reproducing apparatus that performs recording/reproduction of information by a light irradiation onto a recording mark of an information recording medium, the information recording and reproducing apparatus comprising:

an optical system that forms a recording mark by irradiating light onto the information recording medium to record information or reproduce information from the recording mark, wherein the light irradiating is performed while changing an erase DC power for each region of the recording medium; and a control unit for adjusting a power of the light being irradiated onto the information recording medium wherein the control unit is configured to:

measure an initial value of a signal amplitude or a signal modulation from the readout signal reproduced from the recording mark, measure a second value of a signal amplitude or a signal modulation by the light irradiation with a reproducing power after a step of said irradiating the light, find a power Pth to be a certain ratio of the second value to the initial value, and determine a read power of the light to be irradiated onto the information recording medium based on the power Pth.

15. The information recording and reproducing apparatus according to claim 14, wherein the power Pth is a power of the irradiation light required to vary by a predetermined ratio the amplitude of the readout signal that is found when light is irradiated onto the recording mark once by means of DC irradiation.

16. The information recording and reproducing apparatus according to claim 14, wherein the read power is calculated by multiplying the power Pth by a predetermined coefficient $\alpha$.

17. The information recording and reproducing apparatus according to claim 16, wherein the coefficient $\alpha$ is a ratio of a read power Pr(n) at which information recorded on the information recording medium can be reproduced for a predetermined number of times to the power Pth.

18. The information recording and reproducing apparatus according to claim 17, wherein the read power Pr(n) is a power required to vary a readout error rate to a predetermined value by irradiating light onto the recording mark for a predetermined number of times.

19. The information recording and reproducing apparatus according to claim 16, wherein the coefficient $\alpha$ is recorded beforehand on the information recording medium.

* * * * *